United States Patent [19]
Heithoff

[11] 3,899,317
[45] Aug. 12, 1975

[54] GLASS BATCH LOG CONTROL DEVICE AND METHOD FOR USING

[75] Inventor: Robert B. Heithoff, Cumberland, Md.

[73] Assignee: PPG Industries, Inc., Pittsburgh, Pa.

[22] Filed: July 23, 1973

[21] Appl. No.: 381,467

[52] U.S. Cl. ............... 65/135; 65/335; 65/337; 65/345
[51] Int. Cl. ............................................ C03b 5/20
[58] Field of Search ............ 65/134, 135, 136, 137, 65/335, 337, 339, 340, 345, 342, 343

[56] References Cited
UNITED STATES PATENTS

| | | | |
|---|---|---|---|
| 3,208,841 | 9/1965 | Burch | 65/335 X |
| 3,420,653 | 1/1969 | Boettner | 65/134 X |
| 3,495,966 | 2/1970 | West | 65/134 X |
| 3,498,779 | 3/1970 | Hathaway | 65/355 X |
| 3,666,432 | 5/1972 | Kunkle et al. | 65/338 X |
| 3,780,891 | 2/1957 | Arbeit | 65/335 |

*Primary Examiner*—Robert L. Lindsay, Jr.
*Attorney, Agent, or Firm*—E. Kears Pollock

[57] ABSTRACT

Unmelted glass batch materials are maintained in the central portion of a glass melting furnace by inserting an anchoring element of a log control device into the unmelted batch materials. The anchoring element of the log control device mechanically anchors the glass batch, preventing it from drifting outwardly into contact with the furnace side walls. The anchoring device is preferably a cooled pipe bent in such a manner as to impose some drag upon the glass batch materials, and it is preferably rotatably mounted in order that its position may be adjusted as necessary to maintain the position of the glass batch.

8 Claims, 3 Drawing Figures

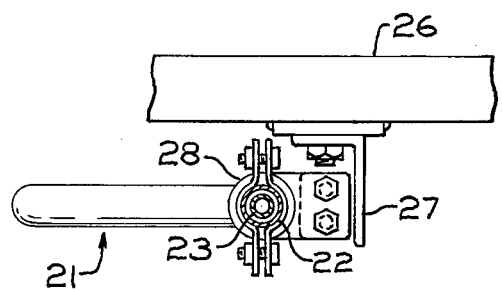
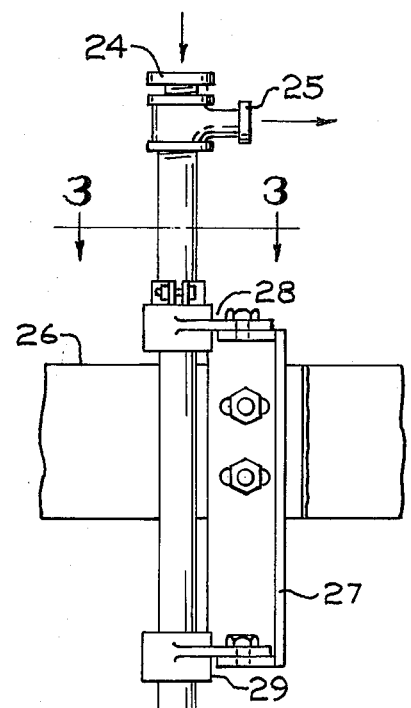
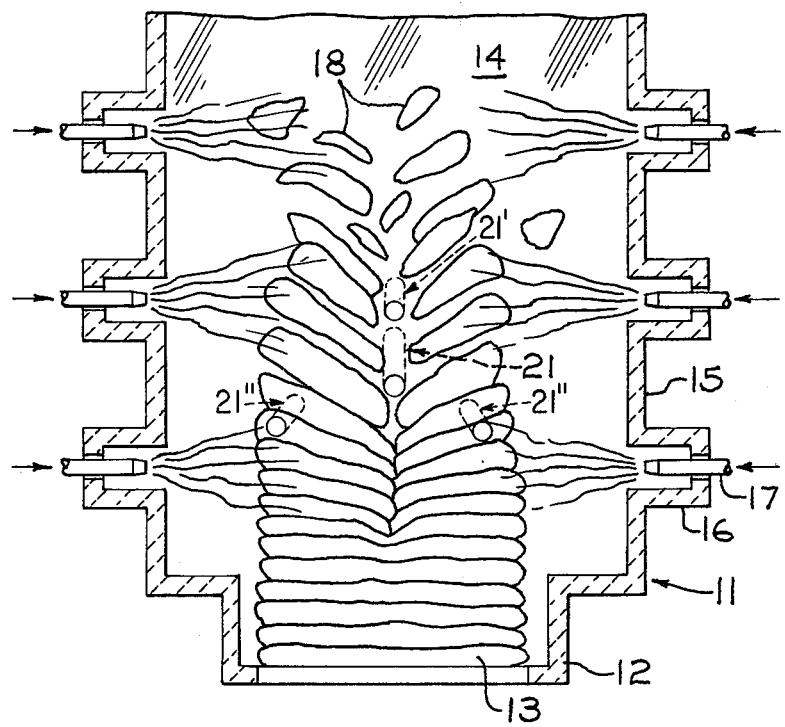

GLASS BATCH LOG CONTROL DEVICE AND METHOD FOR USING

BACKGROUND OF THE INVENTION

1. Field of the Invention

This invention relates broadly to the art of glassmaking. More particularly, it is concerned with a method and apparatus for maintaining batch materials supplied to a glass melting tank or furnace within a desired predetermined path of movement.

2. Description of the Prior Art

In the manufacture of glass, raw materials are first melted and reacted to form molten glass, and this molten glass is then conditioned and formed into useful articles. Raw batch materials for manufacturing glass comprise scrap glass or cullet, sand, limestone, soda ash, salt cake, rouge, and the like. These raw batch materials are charged to a glass melting furnace in the continuous manufacture of glass. Heat is supplied within the glass melting furnace to melt the raw batch materials and permit the necessary reactions to form molten glass.

Conventionally known glass melting furnaces are recuperative furnaces and regenerative furnaces. These furnaces are provided with means for supplying heat by the combustion of fuels using preheated air. The heat is supplied to the molten glass in the glass batch materials by burning the fuel in flames passing above the molten glass and above the glass batch material. Additional heat may be supplied to the molten glass in such furnaces using submerged heaters, typically electric heaters. Also, furnaces using electric heaters alone have been known.

In all these typical, conventional furnaces a chamber for containing the molten glass is provided. The chamber for containing the glass comprises the bottom of the furnace; side walls, generally parallel to the general movement of glass through the furnace; a back wall, in the vicinity of which raw batch materials are fed or charged into the furnace; and a front wall at the opposite end of the furnace from the back wall, in the vicinity of which conditioned molten glass is removed for forming. Extending over the chamber of the furnace is a roof which provides a headspace above the molten glass. Heating flames are directed into this headspace above the molten glass generally from firing ports located along the opposing side walls of the furnace.

Raw glass batch materials are charged to the furnace, generally through the back wall. Most conventional furnaces are provided with a "fill doghouse" extending outwardly from the back wall into which raw glass batch materials are charged. The raw glass batch materials are fed continuously onto a pool of molten glass which forms within the furnace and is contained by the walls and bottom of the furnace. Alternatively, glass batch may be intermittently fed or charged into the furnace.

Continuous charging is generally accomplished using devices commonly characterized as blanket feeders comprising, for example, continuous conveyors for carrying glass batch materials into the "fill doghouse". Intermittent charging is generally carried out by using a glass batch pusher. In the use of such a device, raw glass batch materials are deposited onto a shelf extending out from the fill doghouse. A single or multiple element pushing bar periodically is thrust forward against the batch, pushing it into the fill doghouse. When employing either conventional charging technique, a blanket-like mass of unmelted batch materials is caused to form on the surface of molten glass confined in the back of a furnace. This blanket-like mass of raw batch materials floats along the surface of molten glass in the glass melting furnace in a downstream direction away from the fill doghouse and toward the front wall of the furnace.

As the blanket-like layer of glass batch materials floats downstream through the glass melting furnace, it receives heat both from the heating flames extending over it and from the molten glass beneath it. This causes the batch materials to melt and react, forming more molten glass. The blanket-like layer of raw batch materials in the vicinity of the fill doghouse is substantially continuous and extends nearly from one side wall to the opposite side wall. As the batch materials move through the glass melting furnace, melting occurs and the blanket of batch material breaks up into individual floating islands or logs of batch material. Throughout this process there is a tendency for raw batch materials to drift or move outwardly and engage the side walls of the furnace. This causes extensive reaction between the glass batch materials and the refractory materials forming the side walls, causing severe corrosion of the side walls. This not only results in excessive rate of wear for the side walls, but also causes defects to form in the glass as metallic materials within the refractory side wall structure are released into the molten glass by the partial dissolution of the side wall materials. For example, chrome is often released from common refractory materials. It enters into the glass, forming objectionable chrome stones in the ultimate glass product. The batch materials are far more corrosive of refractories used to construct glass melting furnaces than is molten glass, for the flux ingredients of the glass batch are chemically free compounds within the glass batch itself.

Because of the deleterious effects of glass batch materials encountering and contacting glass melting furnace walls, those skilled in the art of glass manufacture have long recognized the need to prevent or at least minimize such contact. It has been common practice to manually push raw batch blankets and logs away from the side walls of glass melting furnaces into the center portion of such furnaces. This has been accomplished, for example, by using long, water-cooled pushers to engage the glass batch logs as they approach the walls and to push them back toward the center of the furnace. U.S. Pat. No. 3,294,506 to Blaine discloses an automatic pushing device located within a fill doghouse to engage the edges of a batch blanket and push these edges inwardly away from the side walls.

Other methods have also been suggested for preventing raw batch materials from engaging the walls of a glass melting furnace. For example, U.S. Pat. No. 3,592,623 to Shepherd discloses a recuperative furnace having a high-intensity burner positioned to engage the floating batch material with an oxygen-enriched flame of sufficient force to influence the flow or movement of the raw batch materials by the creation of a hot spot in a central portion of the glass melting furnace.

Another approach has been proposed by Stevenson in U.S. Pat. No. 3,670,908. This patent discloses apparatus for feeding raw batch materials into a glass melting furnace from three locations and feeding glass batch materials from only two locations at a time in order to impose an initially directed movement to the glass batch materials in order to center them within a glass melting furnace.

A method for thermally controlling the position of glass batch materials with a glass melting furnace is disclosed in U.S. Pat. No. 3,495,966 to West. This patent discloses apparatus for substantially cooling the central portion of a glass melting furnace within the region of the furnace where floating raw batch materials exist in order to establish a central temperature below the temperature of the molten glass near the side walls of the glass melting furnace and thereby establish convection currents to urge the unmelted glass batch logs to move toward the central portion of the glass melting furnace. This patent discloses removing heat from the central portion of molten glass at a rate on the order of almost one million BTU/hour for a furnace containing approximately 1400 tons of molten glass. This patent further discloses cooling the central portion of a glass melting furnace by positioning a radiation shield above the central portion of the molten glass in the melter of a furnace to shield that portion of the molten glass batch from the influence of heating flame extending into the headspace of the molten glass. It must be noted in connection with this patent that the temperature of the molten glass in the center of a conventional furnace beneath a blanket of batch is generally 50°F. to 100°F. below the temperature of molten glass along either side wall which is not under the blanket of batch and thus not shielded from direct radiant heating from the overhead flames.

The devices and methods employed in the past to control the position of glass batch logs and floating glass batch blankets have not been wholly successful. For the most part, the methods employed in the past have not substantially affected glass batch log position a sufficient distance downstream into a glass melting furnace to prevent all glass batch-side wall contact. This is a problem, for example, in the practice disclosed in the patent of Blaine. The pushers are effective only in the fill doghouse, and the glass batch floating downstream through the furnace is free thereafter to drift outwardly into contact with the furnace side walls. Devices such as disclosed in the patent of West are also of limited influence well downstream of the fill doghouse. They are positioned through the fill doghouse and remove substantial heat from the glass furnace, which heat removal would be even greater if it were attempted to extend such devices farther downstream into the furnace.

The present invention provides an improved method and apparatus for accomplishing the long-recognized need of controlling the position of glass batch throughout a glass melting furnace.

Summary of the Invention

A conventional glass melting furnace is provided with a batch control device comprising at least one anchoring element extending downwardly into the furnace and engaging raw batch materials floating on the molten glass in the furnace. An extreme portion or tip of the anchoring element extends a sufficient length along or near the surface of the molten glass to impose a drag on glass batch coming into contact with it.

The portion of the anchoring element which engages the batch preferably has an asymmetric projection in the plane of the molten glass surface and is rotatably or otherwise movably mounted in order to conveniently alter the area of drag imposed upon glass batch materials coming into contact with it. A projection of the anchoring element into a plane perpendicular to the plane of the surface of molten glass furnace is also preferably asymmetric.

The anchor element may comprise a refractory block that is resistant to corrosion due to contact with glass batch materials. Such a block may be suspended in the glass batch by a cooled metal arm or similar structure extending inwardly from the sides of the furnace or downwardly from the roof of the furnace.

A preferred embodiment of the present invention employs an anchoring element comprising a water-cooled pipe extending downwardly through the roof of a furnace along a generally vertical axis with its lower end or tip bent outwardly from the general vertical axis. This configuration provides a large area of contact between the anchoring element and the glass batch into which it is inserted during operation. Such an anchoring element is preferably constructed of stainless steel or like material which will not contaminate the glass batch. Such an anchoring element may comprise a hairpin pipe arrangement with coolant being provided through the single pipe to protect the metal from sag or undue fatigue under normal operating conditions.

A particularly preferred embodiment in this invention comprises a double pipe arrangement. An outer pipe is provided and an inner pipe is concentrically disposed within the outer pipe and spaced from it by spacer elements to provide an annular space between the pipes. Coolant, such as water, is directed downward through the inner pipe, out to the annular space and back through the annular space to be discharged. The flow of coolant may be reversed.

In the operation of metal anchoring elements which require cooling, cooling is limited to that sufficient to protect the anchoring element from unnecessary fatigue and sagging. It is not intended to provide so much cooling so that the glass batch and glass coming into contact with the anchoring element will be substantially cooled. Such cooling is not essential and merely wastes heat which has been provided for melting the batch materials.

In the practice of this invention, a single anchoring element may be employed. When a single anchoring element is employed, it is preferably located at or near the centerline of a glass melting furnace and is preferably positioned downstream from the back wall or fill doghouse of the furnace beyond the first firing port, or at least about 20 feet downstream in a conventional regenerative furnace. The anchoring element is installed at a location where the batch blanket is sufficiently continuous so that the anchoring element will generally at all times be contacted by unmelted batch materials. A location substantially immediately upstream of the location where the batch blanket regularly breaks up and into separate logs is a preferred location.

The bottom tip of extreme portion of an anchoring element is preferably at an elevation or depth such that it penetrates the floating batch material on the order of about 2 to 10 inches in depth and preferably on the order of about 5 to 8 inches in depth. During operation, glass batch passing against the anchoring element will be furrowed to some extent due to the dragging action of the anchor element.

A plurality of anchoring elements may be used to advantage, particularly in relatively wide glass melting furnaces. For example, two anchoring elements may be positioned on opposite sides of the centerline of the furnace, each engaging a glass batch blanket. These two anchoring elements may be effectively positioned outwardly from the centerline only a short distance or even out to the extent of normal batch blanket edge locations.

An anchoring element, according to this invention, is preferably provided with means for controllably orienting the portion of the element which is in contact with the glass batch. For example, the preferred embodiment of this invention comprises a cooled, bent pipe extending downwardly through the roof of a furnace. This pipe is rotatably mounted so that it may be rotated about the axis of its major portion which extends vertically downward into the tank. Rotation of this anchoring element changes the orientation of the bent lower tip of the anchoring element and changes the location of the tip of the anchoring element with respect to the centerline of the glass melting furnace. While there is generally insufficient adherence or drag between glass batch and such an anchoring element to pull and push glass batch one way or another, it has been found to be possible to effectively steer the floating blanket of glass batch by slowly rotating the preferred anchoring element.

In an embodiment of this invention employing two anchoring elements disposed on either side of the centerline of the glass melting furnace, a preferred arrangement is to orient each of the anchoring elements such that downstream extremity of each tip that is farthest from the fill doghouse is closer to the centerline of the furnace than is the portion of each anchoring element that is in contact with the glass batch closest to the fill doghouse. Such an arrangement tends to force all of the glass batch floating on the molten glass to be maintained in and moved toward the centerline of the glass melting furnace.

Two or more anchoring elements may be positioned along or near to the centerline of a glass melting furnace. In one quite successful embodiment of this invention, two anchoring elements, each of the kind already described, are employed. An upstream anchoring element is positioned on the centerline of a furnace about 4 to 6 feet upstream from the center of the second ports (in any event, about midway between the first ports and the second ports). A downstream anchoring element is positioned on the centerline of the furnace at or preferably just upstream (of the order of 6 inches to 1 foot) of the second ports. Port positions are indicated as the centerlines of the ports.

The glass melting furnace is operated with both anchoring elements in use. Log control is stable without any batch drifting tendency observed.

Because the headspace of a conventional glass melting furnace contains products of combustion, volatile products of glass reaction and dust emanating from the glass batch itself, there exists the likelihood that an anchoring element will be quickly corroded. This is particularly true in the vicinity of a melting furnace roof opening through which an anchoring element is inserted. Condensation of volatile materials, particularly sulfer-containing materials, might be expected to cause acid formation and corrosive attack of an anchoring element. This may be effectively eliminated by directing an inert gas or air downward through the roof opening surrounding the anchoring element. Means for such purging may simply comprise a housing surrounding the opening into which a compressed air or nitrogen line is connected.

This invention will be further understood with reference to the accompanying drawings.

BRIEF DESCRIPTION OF THE DRAWINGS

FIG. 1 is a diagrammatic plan view of the batch charging end of a continuous glass melting furnace showing the location of an anchoring element of a log control device.

FIG. 2 is an elevation view of a preferred anchoring element disposed within a glass melting furnace.

FIG. 3 is a sectional plan view of the anchoring element shown in FIG. 2 taken along section line 3—3.

DETAILED DESCRIPTION

Referring to FIGS. 1, 2 and 3, a glass melting furnace 11 comprises a bottom, a back wall having a fill doghouse 12 into which glass batch materials are fed to form a blanket-like layer of glass batch materials 13 floating on a pool of molten glass 14. The blanket-like layer of glass batch materials 13 moves downstream through the glass melting furnace 11 between side walls 15.

Extending out from the side walls 15 are firing ports 16. Extending into each firing port 16 is a burner 17 for providing heat to the glass batch materials to melt them and cause them to react to form more molten glass. The heat is supplied by flames extending into a headspace over the molten glass 14 and the glass batch material 13. The furnace 11 shown is a typical regenerative furnace so that flames alternately enter the furnace from one side and products of combustion pass out of the furnace headspace into the firing ports of the opposite side of the furnace during each firing cycle.

As the blanket-like layer of raw batch materials 13 moves downstream from the fill doghouse 12 while floating on the pool of molten glass 14, it becomes melted and breaks up into individual glass batch logs 18 which continue to float on the molten glass 14 until they are completely melted. The molten glass, of course, continues to flow downstream through a refining and conditioning section of the furnace toward a front wall (not shown). The molten glass is then discharged to some glass forming means, such as, for example, a float forming bath (also not shown).

Extending over the molten glass 14 and batch blanket 13 in the glass furnace 12 is a furnace roof 20. In a preferred embodiment of this invention, a hole is provided in the furnace roof 20 at or near the centerline of the furnace at a location downstream of the first firing ports and preferably at or near the second firing ports. Through this hole in the roof 20 of the glass furnace 12 is extended an anchoring element 21.

The anchoring element 21 is preferably a water-cooled, rigid member with its bottom portion bent so that its tip is offset from its main axis. The anchoring element 21 is sufficiently rigid as to be substantially non-deformable at operating temperatures.

In another embodiment, the anchoring element comprises a pair of concentric pipes with the outer pipe 22 being a nominal 1½ inch diameter pipe of 446 stainless steel and the inner pipe 23 being nominal diameter 1⅛ inch copper tubing. An annular spacing is maintained between the pair of pipes by soldering spacing elements at at least three locations about the circumference of the inner pipe 23 at intervals along its length on the order of about 1 foot. The pipes are bent at their lower ends so that the tip of the anchoring element is offset from the axis of the long vertical run of the pipes by about 18 inches. Connected to the inner pipe 23 is an inlet coupling 24 for connection to a source of coolant, such as a source of cooling water. Connected to the outer pipe 22, in communication with the annular space between the pipes, is an outlet coupling 25 for connection to a conduit for discharging coolant from the anchoring element 21.

A supporting structure is provided for the anchoring element 21. A conventional structural beam 26 is disposed over the glass melting furnace 11 and is mounted in fixed relation thereto. Connected to this beam 26 is a bracket 27 having a pair of collars 28 and 29 for receiving and holding the anchoring element 21. These collars 28 and 29 may be provided with bearings or the like (not shown) to assist in the rotation of the anchoring element 21. Also, the anchoring element 21 may optionally have connected to it means for automatically reorienting or rotating it to alter the location of contact between the tip of the anchoring element 21 and the floating glass batch 13. A suitable anchoring element assembly, as shown in the accompanying drawings, weighs less than about 200 pounds, and is easily installed in an existing conventional glass melting furnace.

The preferred location of a single anchoring element within a furnace is shown by the element indicated by reference numeral 21 in FIG. 1. When two centerline positioned elements are employed as described above, the preferred location of the first is that already indicated while the preferred location of the second is shown by the element indicated by reference numeral 21' in FIG. 1. When side positioned anchoring elements are employed as described above, their preferred locations and orientations are as shown by the elements indicated by reference numerals 21'' in FIG. 1.

A glass melting furnace comprising the improvement of the glass batch log control device disclosed here is operated as follows. The anchoring element of the log control device is connected to flexible water hoses and is lowered through a hole in a roof of the furnace by a winch until the tip of the anchoring element is buried in the glass batch. Water is then pumped through the pipes of the anchoring element at a rate of about 30 gallons per minute. The water experiences a temperature rise of about 30°F.

The batch material is manually pushed in a conventional manner inwardly into contact with the anchoring element and the tank is then allowed to operate with batch charging in the normal fashion and without manual pushing of the batch logs. The movement of batch logs downstream of the anchoring element is observed and movement toward the side walls is rare compared to conventional operation. Some slight movement may be observed toward the sides of the tank on the order of about two to four times per 8-hour period, but the logs do not dam nor drift outwardly into contact with the side walls. A slight compensating rotation of the anchoring element in a direction opposite to any slight drift is sufficient to maintain the movement of glass batch materials in the central portion of the tank for a period of several days or more without even occasional batch drift or movement into contact with the side walls. The molten glass temperatures in the vicinity of the second ports are: 2230°F. at the centerline and 10 inches beneath the surface and 2300°F. along the sides outside the region of the batch blanket at the same depth.

One particularly beneficial and unexpected benefit obtained by using the log control technique of this invention is a significant drop in the occurrence of unmelted batch stones occurring in the glass formed from molten glass taken from the glass melting furnace. Not only does the log control technique according to this invention maintain the batch materials in the central hot region of a glass melting furnace insuring melting, but also it prevents unnecessary excessive cooling of the central portion of glass so that complete batch melting, along with reaction and dissolution, is permitted.

In the practice of this invention, heat is removed from the anchoring element at a rate of less than about 35K BTU per ton of glass produced.

Another particularly beneficial benefit obtained by using the log control technique of this invention is the improved operation of a glass melting furnace using electric booster heating. In such a furnace, electrodes extend into the molten glass at locations beneath the normal batch blanket region. In addition to firing the furnace with flames above the batch, power is supplied to the electrodes to heat the glass and batch from below. Excessive batch drifting results in excessive heat loss from properly positioned electrodes, and conventional batch pushing breaks off electrodes. When using the log control device of this invention, uniform electric heating is maintained over extended periods. In this manner, the capacity of an otherwise conventional glass melting furnace may be increased on the order of at least about 5 to 10 percent.

It will be readily apparent to those skilled in the art of glass manufacture that anchoring elements having specific designs other than the preferred embodiments described in detail here may be employed in the practice of this invention. Accordingly, the present disclosure is not to be viewed as limiting the scope of the present invention which is defined by the claims appended hereto.

I claim:

1. In an apparatus for the manufacture of glass comprising a glass melting furnace having a bottom, side walls, a front wall, a back wall and a roof; further having, in the vicinity of said back wall, means for charging glass batch materials into said furnace; further having, in the vicinity of said front wall, means for discharging molten glass from said furnace; and further having means for supplying heat to at least a portion of said furnace for melting glass batch materials forming molten glass therefrom; wherein a portion of said furnace is for moving glass batch materials floating on molten glass in a general direction away from said back wall and toward said front wall while melting said floating glass batch materials; the improvement comprising an elongated anchoring element extending downwardly in said furnace at a location spaced from said back wall yet where floating batch materials are encountered, said anchoring element having a downwardly extending portion and, at its lower extreme, an outwardly extending portion adapted for contacting the upper portion of floating batch materials and imposing a drag upon the floating batch materials for controlling the movement of the floating batch materials in said furnace, said elongated anchoring element being sufficiently thin so as not to dam said floating batch materials.

2. The apparatus according to claim 1 wherein said furnace is a regenerative furnace having firing ports extending from said side walls and wherein said elongated anchoring element extends downwardly through the roof of said furnace between first firing ports closest to said back wall and second firing ports adjacent the firing ports.

3. The apparatus according to claim 2 comprising at least two of said anchoring elements for contacting floating batch materials, one element located between the center of said furnace and one side wall and one element located between the center of said furnace and the other side wall.

4. The apparatus according to claim 1 wherein said anchoring element is rotatably mounted for rotating about an axis defined by its downwardly extending portion whereby the position of said outwardly extending portion is adjustable with respect to said furnace side walls.

5. The apparatus according to claim 1 wherein said anchoring element comprises a pair of concentrically disposed pipes, an inner pipe and an outer pipe, bent to form said downwardly extending portion and said outwardly extending portion; said concentrically disposed pipes further having coolant inlet and coolant discharge means connected thereto for circulating coolant through said inner pipe and an annular space formed between said pipes for maintaining said pipes substantially nondeformable.

6. The apparatus according to claim 3 wherein each of said anchoring elements outwardly extending portion at its lower extreme extends outwardly from its downwardly extending portion toward the center of said furnace and away from said back wall.

7. In the making of glass wherein glass batch materials are charged to a glass melting furnace having a bottom, side walls, a front wall, a back wall and a roof and wherein said charged glass batch materials are caused to move away from said back wall toward said front wall between said side walls by floating on molten glass and wherein heat is supplied to said glass batch materials to melt them forming molten glass and wherein molten glass is discharged from said furnace in the vicinity of said front wall and formed into useful articles; the improvement comprising causing said floating glass batch materials to move through said furnace along a predetermined path by contacting said floating glass batch materials and imposing a drag upon the upper portion of said floating glass batch materials which is not sufficient to dam said floating glass batch materials, and maintaining the temperature of molten glass beneath said floating glass batch materials substantially undiminished.

8. The method according to claim 7 wherein said step of imposing a drag upon said floating batch materials is accomplished by contacting said floating batch materials with an anchoring element and cooling said anchoring element at a rate of less than about 35K BTU per ton of glass produced, said anchoring element being sufficiently thin so as not to dam said floating batch materials.

* * * * *